(12) United States Patent
Lahoda

(10) Patent No.: US 6,909,765 B2
(45) Date of Patent: Jun. 21, 2005

(54) METHOD OF UPRATING AN EXISTING NUCLEAR POWER PLANT

(75) Inventor: Edward J. Lahoda, Pittsburgh, PA (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 148 days.

(21) Appl. No.: 10/356,950

(22) Filed: Feb. 3, 2003

(65) Prior Publication Data

US 2004/0151273 A1 Aug. 5, 2004

(51) Int. Cl.$^7$ ............................................. G21C 1/01
(52) U.S. Cl. ................. 376/260; 376/210; 376/211; 376/212; 376/261; 376/241; 376/267; 376/402
(58) Field of Search ................. 376/435, 428, 376/455, 402, 211, 210, 267, 221, 260, 261, 212, 241

(56) References Cited

U.S. PATENT DOCUMENTS

| | | | | |
|---|---|---|---|---|
| 3,109,797 A | * | 11/1963 | Maxwell ..................... | 376/435 |
| 3,213,833 A | * | 10/1965 | Cunningham et al. ...... | 376/402 |
| 3,304,234 A | * | 2/1967 | Frisch ........................ | 376/428 |
| 3,317,399 A | * | 5/1967 | Winders ..................... | 376/435 |
| 3,910,818 A | * | 10/1975 | Sofer ......................... | 376/221 |
| 3,992,884 A | * | 11/1976 | Pacault ....................... | 376/402 |
| 4,015,430 A | * | 4/1977 | Braytenbah et al. ........ | 376/211 |
| 4,059,484 A | * | 11/1977 | Bupp et al. ................. | 376/435 |
| 4,326,922 A | * | 4/1982 | Ferrari et al. ............... | 376/435 |
| 4,652,416 A | * | 3/1987 | Millot ........................ | 376/435 |
| 4,994,233 A | * | 2/1991 | Freeman .................... | 376/428 |
| 5,555,281 A | * | 9/1996 | Williamson et al. ........ | 376/435 |
| 5,991,354 A | * | 11/1999 | Van Swam ................. | 376/455 |

FOREIGN PATENT DOCUMENTS

| AT | 201624 | * | 1/1959 | .................. 376/402 |
|---|---|---|---|---|
| DE | 2202188 | * | 7/1972 | .................. 376/455 |
| GB | 874853 | * | 8/1961 | .................. 376/402 |

OTHER PUBLICATIONS

Nuclear Engineering Int., "Improving LWR Fuel Utilization", pp 13, 14, Feb. 1979.*
Apostolakis, "GE Nuclear Energy Licensing Topical Report, NEDC–33004P, 'Constant Pres Power Uprate' (Revision L)" online available : http://adamswebsearch.nrc.gov/scripts/rwisapi.dll/@pip.env?CQ_session_key=mwjpd . . . Apr. 17, 2002.*
"Press Release–02–051: NRC Approves Power Uprate for South Texas Projec 1 & 2", online, available : http://adamswebsearch.nrc.gov/scripts/rwisapi.dll/@pip.env?CQ_session_key=mwjpd . . . Apr. 22, 2002.*
"Analysis of Proposed TS Change Regarding Increase of License Thermal Power" online available: http://adamswebsearch.nrc.gov/scripts/rwisapi.dll/@pip.env?CQ_session_key=mwjpd . . . Nov. 2002.*

* cited by examiner

Primary Examiner—Harvey E. Behrend

(57) ABSTRACT

An improved method of increasing the power output of an existing nuclear power plant includes increasing the thermal power output of the plant's nuclear island and constructing of an auxiliary BOP to handle the increased thermal power. The thermal power of the nuclear island can be increased such as by increasing the thermal power of the plant's reactor, by replacing the plant's steam generator with one that is more efficient, and by increasing the flow rate and/or change in temperature of a coolant in a secondary cooling loop of the plant. The thermal power of the reactor can be increased such as by replacing existing cylindrical fuel rods with fuel rods having a relatively greater surface area to volume ratio and/or by increasing the flow rate and/or the change in temperature of a coolant of a primary cooling loop. The auxiliary BOP can be constructed while the plant is in operation, and can then be connected with the nuclear island during a maintenance operation on the reactor.

26 Claims, 3 Drawing Sheets

METHOD OF UPRATING AN EXISTING NUCLEAR POWER PLANT

BACKGROUND OF THE INVENTION

1. Field of the Invention

The present invention relates generally to nuclear power plants and, more particularly, to a method of increasing the electrical power output of an existing nuclear power plant.

2. Description of the Related Art

Nuclear power plants may be of various configurations. One type of nuclear power plant employs a nuclear reactor to generate steam which is employed to turn one or more turbines that operate electrical generators. One type of reactor is a pressurized water reactor (PWR). Such a reactor operates by heating water within a primary cooling loop which is maintained at an elevated pressure. A steam generator, which can be characterized as a type of heat exchanger, thermally connects the primary cooling loop with a secondary cooling loop and generates steam in the secondary cooling loop. The secondary cooling loop is connected with the turbines and with a heat sink such as a cooling tower.

In most pressurized water nuclear reactors, a reactor core is comprised of a large number of elongated fuel assemblies. These fuel assemblies typically include a plurality of cylindrical fuel rods that are held in an organized array by a plurality of grids that are spaced axially along the fuel assembly length and are attached to a plurality of elongated thimble tubes of the fuel assembly. The thimble tubes typically receive control rods or instrumentation therein. Top and bottom nozzles on opposite ends of the fuel assembly are secured to the ends of the thimble tubes that extend slightly above and below the ends of the fuel rods.

A nuclear power plant can be said to include a nuclear island and a balance of plant. The nuclear island of a PWR generally includes a containment vessel, the reactor, the steam generator, a pressurizer, and a primary coolant pump, with the reactor, the steam generator, the pressurizer, and the primary coolant pump being disposed within an interior of the containment. A portion of the secondary cooling loop extends into the containment and is connected with the steam generator. The primary cooling loop carries thermal power away from the core to the steam generator, and the secondary cooling loop carries thermal power away from the steam generator to the balance of plant. The balance of plant would generally be stated as including those portions of the plant not included in the nuclear island, and it may be referred to herein as the BOP.

Nuclear power plants are licensed by the Nuclear Regulatory Commission to permit the generation of a certain amount of electrical power. It would be desirable to increase the amount of power that is generated by existing nuclear power plants in order to improve efficiency and to reduce the cost of power generation. However, a given nuclear power plant cannot be operated above its licensed power. Also, existing nuclear power plants generally are already being operated at their maximum capacity. While it would be desirable to enable the generation of additional amounts of electrical power, it would likewise be desirable to generate such additional electrical power with an environmentally friendly resource such as nuclear power without the necessity of building additional nuclear power plants.

It would be desirable, therefore, to provide an improved method of increasing the electrical power output of an existing nuclear power plant. Such an improved method may include the replacement of existing portions of the plant with equipment and/or components that are more efficient and/or that permit the generation of additional amounts of thermal or electrical power. Such an improved method may also include increasing the quantity of fissile material that is loaded into the core in order to increase the duration of the operation cycle of the reactor and/or to offset a reduction in the duration of the service interval that might result from increasing the power level of the reactor. Such an improved method might be such that the resulting improved plant could be relicensed at a higher power level. Such an improved method also might be such that the implementation or performance of the method does not require that the reactor be shut down for extended periods.

SUMMARY OF THE INVENTION

In view of the foregoing, an improved method in accordance with the present invention of increasing the power output of an existing nuclear power plant includes increasing the thermal power output of the plant's nuclear island and constructing of an auxiliary BOP to handle the increased thermal power. The thermal power of the nuclear island can be increased such as by increasing the thermal power of the plant's reactor, by replacing the plant's steam generator with one that is more efficient and/or has a relatively greater heat transfer area, and/or by increasing the flow rate of a coolant in a secondary cooling loop of the plant. The thermal power of the reactor can be increased such as by replacing existing cylindrical fuel rods with fuel rods having a relatively greater surface area to volume ratio. The increased thermal power can be transmitted from the reactor to the steam generator by increasing the flow rate and/or the change in temperature of a coolant of a primary cooling loop flowing through the reactor. The auxiliary BOP can be constructed while the plant is in operation, and can then be connected with the nuclear island during a maintenance operation on the reactor. To prolong the life of the nuclear fuel at such relatively higher power levels, one or more methodologies may be employed, such as by installing reflectors that decrease the loss of neutrons from the core, by using relatively longer fuel rods, by providing a higher enrichment of the U235 in the fuel, and by providing a different type of fuel such as uranium nitride (UN).

Accordingly, an aspect of the present invention is to provide an improved method of uprating an existing nuclear power plant.

Another aspect of the present invention is to provide an improved method of increasing the electrical power output of an existing nuclear power plant.

Another aspect of the present invention is to provide an improved method of increasing the power output of an existing nuclear power plant by increasing the thermal power of the plant's reactor.

Another aspect of the present invention is to provide an improved method of increasing the power output of an existing nuclear power plant by replacing the fuel rods of the plant's reactor with fuel rods having a relatively greater surface area to volume ratio.

Another aspect of the present invention is to provide an improved method of increasing the power output of an existing nuclear power plant by replacing the plant's steam generator with an improved steam generator having a relatively greater thermal efficiency and/or a relatively greater heat transfer area.

Another aspect of the present invention is to provide an improved method of increasing the power output of an existing nuclear power plant by increasing the thermal power of a plant's nuclear island and by constructing an auxiliary BOP to handle the increased thermal power.

Another aspect of the present invention is to provide an improved method of increasing the power output of an existing nuclear power plant while minimizing the financial impact of performing the method, such as by constructing an auxiliary BOP while the plant is in operation and by connecting the constructed auxiliary BOP to the reactor while the reactor is shut down during a scheduled maintenance operation on the reactor.

Another aspect of the present invention is to provide an improved method of increasing the power output of an existing nuclear power plant while minimizing the financial impact of performing the method by constructing, while the plant is in operation, replacement parts for an uprated nuclear island such as new core internals, different fuel rods, an uprated steam generator, and a different pressurizer, and by installing the constructed replacement parts in the nuclear island when the reactor is shut down during a scheduled maintenance operation on the reactor, such as when an auxiliary BOP may be connected with the nuclear island.

Another aspect of the present invention is to provide an improved method of increasing the electrical power output of an existing nuclear power plant substantially without altering a containment of the plant Another aspect of the present invention is to provide an improved method of increasing the thermal power of a reactor of an existing nuclear power plant without correspondingly reducing the service interval of the reactor, such as by loading a relatively greater quantity of fissile material into the reactor during a maintenance cycle.

Another aspect of the present invention is to provide an improved method of increasing the power output of an existing nuclear power plant while minimizing the amount of down time of the power plant during performance of the method.

Accordingly, an aspect of the present invention is to provide a method of increasing the electrical power output of an existing nuclear power plant. The plant includes a nuclear island and a balance of plant connected together, with the nuclear island including a containment having an interior, a pressurized water reactor having a number of fuel rods that include fissile material, and a steam generator. The reactor and the steam generator are disposed within the interior of the containment, with the containment outputting thermal power, and with the balance of plant outputting electrical power. The general nature of method can be stated as including increasing the thermal power output from the containment, providing an auxiliary balance of plant, delivering a portion of the thermal power to the auxiliary balance of plant, and outputting electrical power from the auxiliary balance of plant.

The reactor outputs thermal power, and thus said increasing the thermal power output from the containment may include increasing the thermal power output of the reactor. The fuel rods have a surface area to volume ratio, and thus said increasing the thermal power output of the reactor may include increasing the surface area to volume ratio of the fuel rods.

Since the reactor outputs thermal power, it includes a primary cooling loop carrying a primary coolant. The plant also includes a secondary cooling loop carrying a secondary coolant and being connected with the balance of plant and the auxiliary balance of plant. The steam generator thermally connects together the primary and secondary cooling loops.

As such, said increasing the thermal power output from the containment may include at least one of:
increasing the thermal power output of the reactor;
increasing the flow rate of the primary coolant;
increasing the change in temperature of the primary coolant flowing through the steam generator;
increasing the change in temperature of the primary coolant flowing through the reactor;
increasing the flow rate of the secondary coolant;
increasing the change in temperature of the secondary coolant flowing through the steam generator; and
increasing the thermal efficiency of the steam generator.

Another aspect of the present invention is to provide a method of increasing the electrical power output of an existing nuclear power plant substantially without a need of altering a containment of the plant. The plant includes a nuclear island and a balance of plant connected together. The nuclear island includes the containment having an interior, a pressurized water reactor having a number of fuel rods that include fissile material, and a steam generator. The reactor and the steam generator are disposed within the interior of the containment, with the reactor outputting thermal power, and with the balance of plant outputting electrical power. The general nature of method can be stated as including increasing the thermal power output of the reactor, thermally connecting an auxiliary balance of plant to the reactor, and outputting electrical power from the auxiliary balance of plant.

The method may further include increasing the quantity of fissile material in the fuel rods. Said increasing the quantity of fissile material in the fuel rods may include at least one of:
replacing the fuel rods with other fuel rods that are relatively longer;
installing neutron reflectors to increase the efficiency of neutron usage and thereby increase the effective quantity of fissile material in the fuel rods;
replacing the fissile material with other fissile material having a lower neutron cross section;
increasing the concentration of the fissile material compared with non-fissile material in the fuel rods; and
increasing the density of the fissile material in order to accommodate more fissile material in the fuel rods.

The method may also include connecting the auxiliary balance of plant with the containment during a scheduled shutdown of the reactor for the performance of a maintenance operation on the reactor. Such method may further include at least partially building the auxiliary balance of plant prior to initiating the shutdown of the reactor.

The method may also include building new reactor internals, fuel rods, steam generator, pressurizer, and other equipment prior to initiating the shutdown of the reactor.

BRIEF DESCRIPTION OF THE DRAWINGS

A further understanding of the invention can be gained from the following description of the preferred embodiments when read in conjunction with the accompanying drawings in which.

Similar numerals refer to similar parts throughout the specification.

DESCRIPTION OF THE PREFERRED EMBODIMENT

Figure 1:
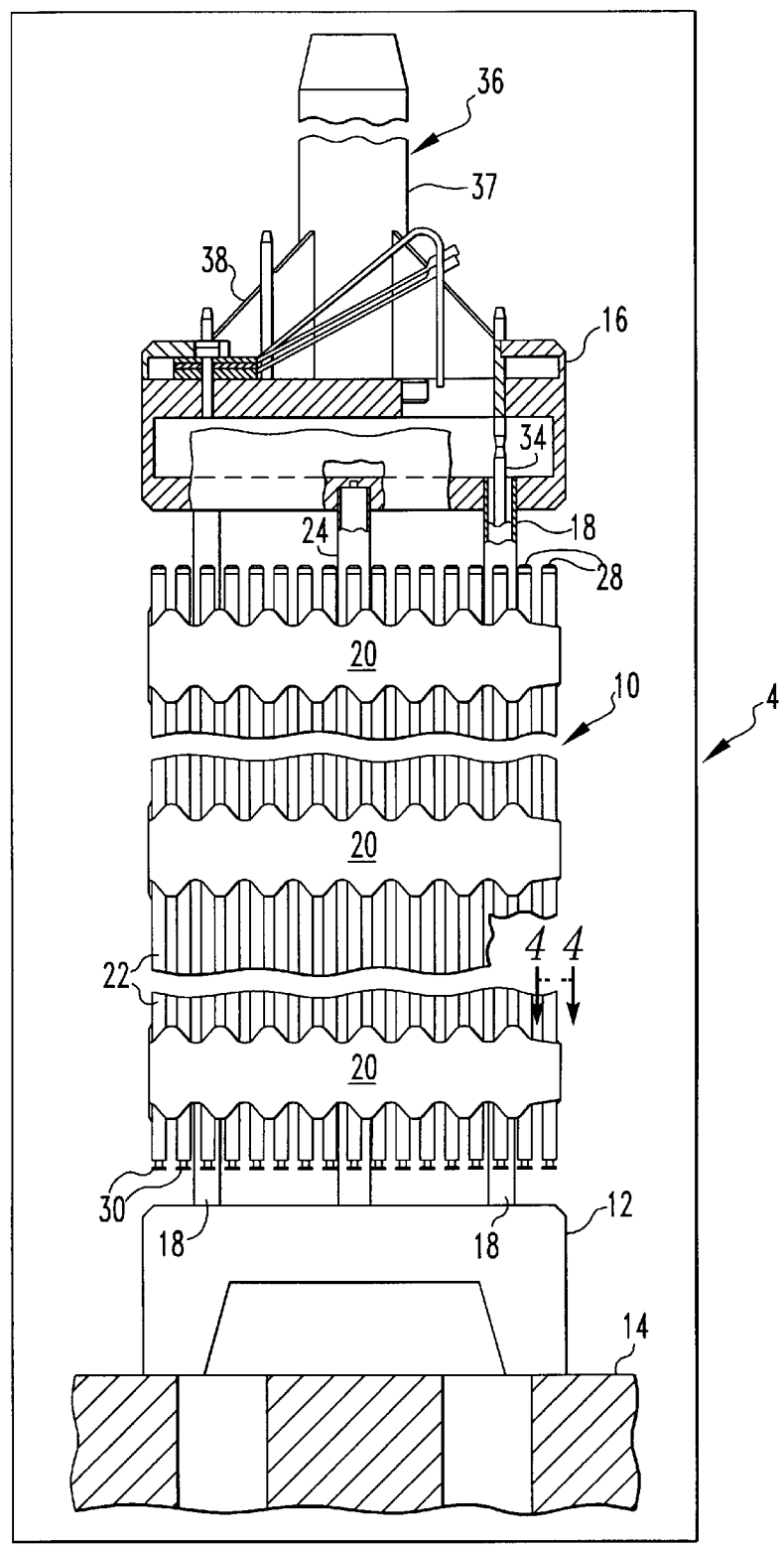
FIG. 1 is a schematic elevational view of a PWR type nuclear reactor including a schematically depicted and foreshortened fuel assembly, partially in section, in accordance with the present invention.

An exemplary fuel assembly 10 mounted in a schematically depicted nuclear reactor 4 is depicted generally in FIG. 1. One or more of the various components of the fuel assembly 10 and/or other components can be referred to as the internals of the reactor 4.

The fuel assembly 10 includes a bottom nozzle 12 that supports the fuel assembly 10 on a lower core support plate 14 in the core region of the nuclear reactor 4. The nuclear reactor 4 is a pressurized water reactor that includes a plurality of the fuel assemblies 10 disposed on the core support plate 14. In addition to the bottom nozzle 12, the structural skeleton of the fuel assembly 10 also includes a top nozzle 16 at its upper end and a number of elongated guide tubes or thimble tubes 18 which extend longitudinally between the bottom and top nozzles 12 and 16 and at opposite ends are connected therewith.

The fuel assembly 10 further includes a plurality of transverse grids 20 axially spaced along and mounted to the thimble tubes 18 and an organized array of elongated fuel rods 22 transversely spaced and supported by the grids 20. Also, the exemplary fuel assembly 10 depicted in FIG. 1 includes an instrumentation tube 24 located in the center thereof that extends between the bottom and top nozzles 12 and 16. With such an arrangement of parts, the fuel assembly 10 forms an integral unit capable of being conveniently handled without damaging the assembly parts.

As mentioned above, the fuel rods 22 in the array thereof in the fuel assembly 10 are held in spaced relationship with one another by the grids 20 spaced along the length of the fuel assembly 10. Each fuel rod 22 includes a plurality of nuclear fuel pellets and is closed at its opposite ends by upper and lower end plugs 28 and 30. The fuel pellets are composed of fissile material and are responsible for creating the reactive power of the nuclear reactor 4.

A liquid moderator/coolant such as water, or water containing boron, is pumped upwardly through a plurality of flow openings in the lower core plate 14 to the fuel assembly 10. The bottom nozzle 12 of the fuel assembly 10 passes the coolant flow upwardly through the thimble tubes 18 and along the fuel rods 22 of the assembly in order to extract heat generated therein for the production of useful work.

To control the fission process, a number of control rods 34 are reciprocally movable in the thimble tubes 18 located at predetermined positions in the fuel assembly 10. Specifically, a rod cluster control mechanism 36 positioned above the top nozzle 16 supports the control rods 34. The control mechanism 36 has an internally threaded cylindrical member 37 with a plurality of radially extending arms 38. Each arm 38 is interconnected to a control rod 34 such that the control mechanism 36 is operable to move the control rods 34 vertically in the thimble tubes 18 to thereby control the fission process in the fuel assembly 10, all in a well-known manner.

Figure 2:
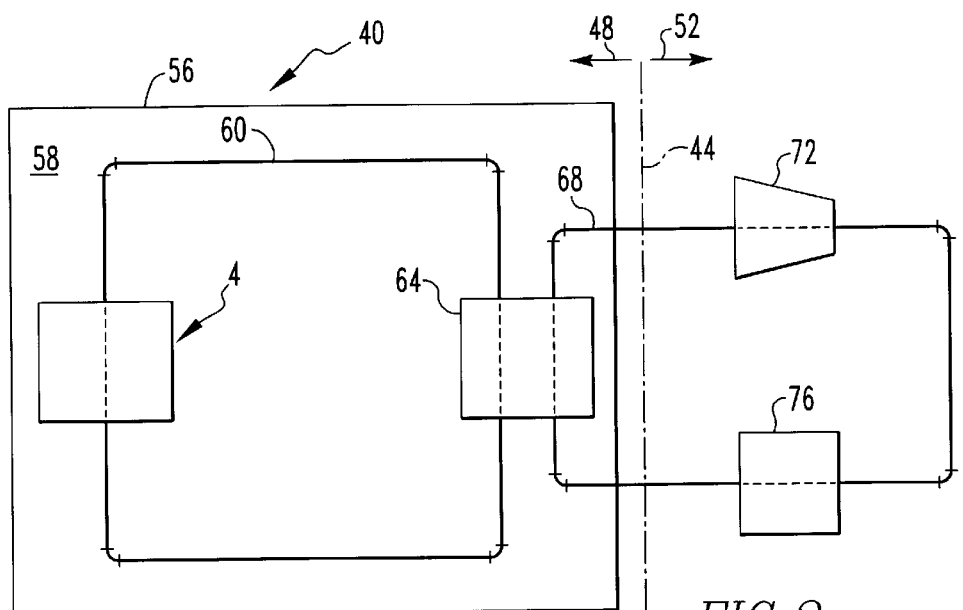
FIG. 2 is a schematic view of an exemplary existing nuclear power plant incorporating the reactor.

An existing prior art nuclear power plant 40 that incorporates the reactor 4 is indicated schematically in FIG. 2. As can be seen from an imaginary dividing line 44, the plant 40 can be said to include a nuclear island 48 and a balance of plant or BOP 52 on opposite sides of the dividing line 44. In a known fashion the nuclear island 48 generates steam power which is delivered to the BOP 52. Also in a known fashion, the BOP 52 generates electrical power from the steam power.

The nuclear island 48 includes a containment 56, a primary cooling loop 60, and a steam generator 64. The containment 56 includes an interior 58 within which the reactor 4, the primary cooling loop 60, and the steam generator 64 are disposed. The aforementioned liquid moderator/coolant such as water with boron is a primary coolant that circulates through the primary loop 60 between the reactor 4 and the steam generator 64. The primary loop 60 carries thermal power from the reactor 4 to the steam generator 64.

The BOP 52 includes a secondary cooling loop 68, a turbine 72, and a heat sink 76. The secondary cooling loop 68 circulates a secondary coolant between the steam generator 64, the turbine 72, and the heat sink 76. The steam generator 64 serves as a heat exchanger that transfers thermal power from the primary cooling loop 60 to the secondary cooling loop 68. It can be seen that a small portion of the secondary cooling loop 68 extends into the containment 56 and into heat exchange contact with the steam generator 64. Such portion or the secondary cooling loop 68 would generally be considered to be a part of the nuclear island 48, it being understood that the balance of the secondary cooling loop 68 is a part of the BOP 52.

The schematically depicted turbine 72 often is several steam turbines that are connected with electrical generators (not expressly depicted) that generate electrical power. The heat sink can be any of a number of know devices for removing residual heat from the secondary coolant, such as a cooling tower or a lake.

Figure 3:
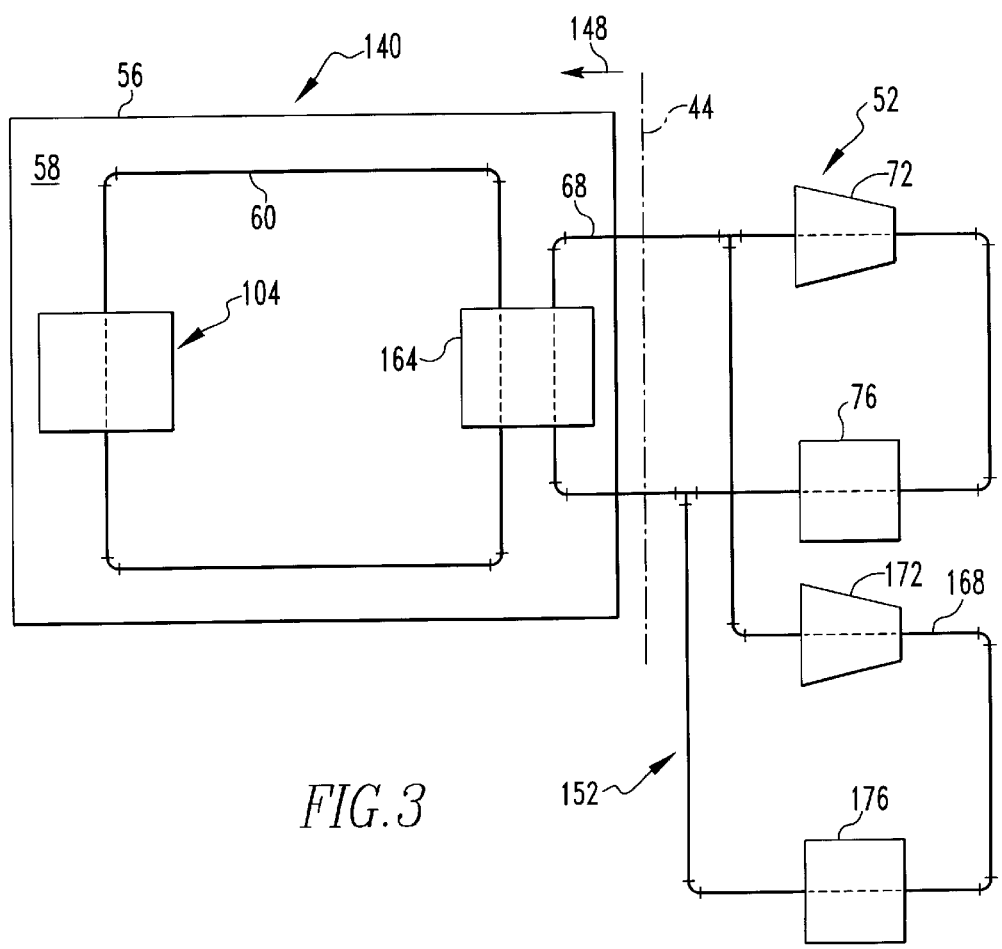
FIG. 3 is a schematic view of the nuclear power plant of FIG. 2 after being uprated by performance of an improved method in accordance with the present invention.

The method of the present invention transforms the existing prior art nuclear power plant 40 of FIG. 2 into an improved and uprated nuclear power plant 140 as depicted in FIG. 3. As will be described in greater detail below, the method of the present invention can be generally stated as involving both increasing the thermal power output of the nuclear island 48 as well as constructing an auxiliary balance of plant 152 to convert such increased thermal power into electrical power. The auxiliary balance of plant 152 may also be referred to herein as the auxiliary BOP 152.

A particular advantage of the method of the present invention is that the auxiliary BOP 152 can be constructed while the plant 40 is in operation. The constructed auxiliary BOP 152 can then be connected with the nuclear island 48 during a scheduled shut down of the reactor 4, such as for periodic maintenance operations, to form the uprated plant 140. Such a methodology takes advantage of a scheduled shut down of the reactor 4, which is less costly than if the reactor 4 were shut down solely to permit connection of the auxiliary BOP 152.

The thermal power output of the nuclear island 48 can be increased in any or all of the ways to be described below. It is also noted that other known methodologies not set forth specifically herein can additionally or alternatively be employed to increase the thermal power output of the nuclear island 48.

One aspect of increasing the thermal power output of the nuclear island 48 is to modify the reactor 4 as described in greater detail below to form the uprated nuclear reactor 104. Another aspect of increasing the thermal power output of the nuclear island 48 is to replace the steam generator 64 with a replacement steam generator 164 that is relatively more efficient and/or has a relatively greater heat transfer area, as described in greater detail below. Another aspect of increasing the thermal power output of the nuclear island 48 is to increase the change in temperature and/or the flow rate of a secondary coolant flowing through the steam generator. These actions generally can be performed during a scheduled shut down, such as when the constructed auxiliary BOP 152 is brought online.

It is noted that such modification and replacement of equipment are chosen so as to substantially not require a modification to the containment 56, since such modification likely would be extremely costly. As such, the modifications and replacements of equipment described herein as to the nuclear island 48 occupy substantially the same amount of space in the containment 56 as what is already occupied by the present equipment. It is also noted, however, that the containment 56 could be modified during performance of the method of the present invention without departing from the scope of the present invention.

The reactor 4 can be modified in any of a number of ways to form the uprated nuclear reactor 104. One aspect in particular is to replace the cylindrical fuelrods 22 (FIG. 4) with a number of alternate fuel rods 122 (FIG. 5) that are of an annular configuration. As used herein, the expression "annular" and variations thereof shall refer broadly to any type of structure having an open channel extending throughout the longitudinal extent thereof, such as would permit the liquid moderator/coolant to flow therethrough. As such, the term "annular" can refer equally to structures having arcuate cross sectional shapes, such as the fuel rod 122 depicted generally in FIG. 5, as well as those having linear cross sectional shapes and combination thereof.

Figure 4:
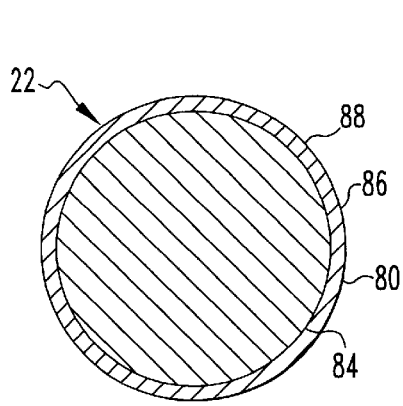
FIG. 4 is an enlarged schematic sectional view of a known fuel rod of the prior art reactor of FIG. 1 as taken along line 4—4 of FIG. 1.

As can be understood from FIG. 4, the known fuel rod 22 includes a cladding 80 and a number of fuel pellets 84. The fuel pellets 84 are generally cylindrical in shape and are enclosed within the cladding 80. The cladding 80 includes a wall 88 that terminates at the upper and lower end plugs 28 and 30. Since the cladding 80 encloses the fuel pellets 84 therein, the cladding 80 can likewise be said to be generally cylindrical since it is not formed with an open channel through which the liquid moderator/coolant could flow.

The fuel rod 22 has a surface area to volume ratio which can be characterized by the ratio of the circumference of the cladding 80 along an external surface 86 thereof to the cross section area of the fuel pellets 84, as are depicted in FIG. 4. During operation of the reactor 4, heat transfer occurs between the fuel rod 22 and the liquid moderator/coolant via convective heat transfer through the external surface 86 of the cladding.

Figure 5:
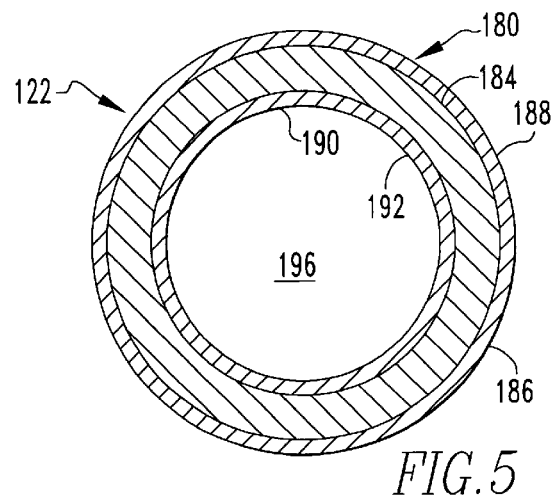
FIG. 5 is an enlarged cut away view of an improved fuel rod that can be employed in the performance of the improved method.

As can be understood from FIG. 5, the improved annular fuel rod 122 has an open channel 196 extending throughout its longitudinal extent through which the liquid moderator/coolant can flow. Specifically, the fuel rod 122 includes a cladding 180 and a quantity of fuel 184. The cladding 180 includes a first wall 188 and a second wall 192, between which is disposed the fuel 184. The first wall 188 includes a first external surface 186, and the second wall 192 includes a second external surface 190. Since the fuel rod 122 includes the open channel 196, which is defined by the second external surface 190, through which the liquid moderator/coolant can flow, the cladding 180 is annular.

It is noted that the fuel 184 is likewise of an annular shape, albeit disposed within the annular cladding 180. The fuel 184 can be installed in the annular cladding 180 in any of a variety of ways, such as by forming annular pellets which are received in the annular cladding 180, by pouring particulate fuel into the annular cladding 180 and thereafter performing one or both of a packing function and a sintering function, and other such methodologies.

The surface area to volume ratio of the fuel rod 122 is characterized by the ratio of the sum of the circumferences of the cladding 180 as measured along the first and second external surfaces 186 and 190 to the cross sectional area of the fuel 184, as are depicted in FIG. 5. According to known mathematical principles, the exemplary annular fuel rod 122 advantageously will have a relatively greater surface area to volume ratio than the fuel rod 22. For example, if the surface area of the fuel 184 were equal to the surface area of the fuel 84, the surface area to volume ratio of the annular fuel rod 122 would be greater than that of the cylindrical fuel rod 22, and would increase as a function of the diameter of the central cavity extending longitudinally through the fuel 184. Compared with the cylindrical fuel rod 22, the exemplary fuel rod 122 thus would have a relatively larger external surface area, as characterized by the sum of the first and second external surfaces 186 and 190. The fuel rod 122 would therefore advantageously permit a relatively greater degree of convective heat transfer to occur between the fuel rod 122 and the liquid moderator/coolant than would occur with the fuel rod 22, assuming equal temperature environments.

Reactors such as the reactor 4 employ the fuel rods 22 to transfer thermal power to the liquid moderator/coolant, which heat transfer generally occurs via convection. According to known principles of thermodynamics, and assuming that all other conditions are equal, if heat transfer to the liquid moderator/coolant occurs along a relatively greater fuel rod surface area, such as would occur along both of the first and second external surfaces 186 and 190 of the fuel rods 122 of the uprated reactor 104, which surface area is greater than the surface area along the external surface 86 of the fuel rods 22, the convective heat transfer between the fuel rods 122 and the liquid moderator/coolant will be relatively greater than with the fuel rods 22. This results in an increased thermal power output from the uprated reactor 104 when compared with the reactor 4.

Assuming all other things being equal, the change in temperature experienced by the liquid moderator/coolant flowing through the uprated reactor 104 would be relatively greater than the change in temperature of the liquid moderator/coolant flowing through the reactor 4, and/or the flow rate of the liquid moderator/coolant through the uprated reactor 104 will be relatively increased. Such change in temperature refers to the difference between the temperature of the liquid moderator/coolant flowing into the reactor and the temperature of the liquid moderator/coolant flowing out of the reactor. A relatively increased change in temperature of the liquid moderator/coolant can result from a change in the temperature of the liquid moderator/coolant entering the uprated reactor 104, a change in the temperature of the liquid moderator/coolant exiting the uprated reactor 104, or both.

According to known principles of thermodynamics, the exemplary fissile material of the fuel 184 will need to be burned at a relatively greater rate than the fissile material of the fuel pellets 84 in order for the uprated reactor 104 employing the fuel rods 122 to actually have a relatively greater rate of convective heat transfer than the reactor 4 using the fuel rods 22. Such relatively increased burning of the fissile material will increase the rate of consumption of the fissile material. As such, if the quantity of fissile material in the fuel rods 122 is the same as in the fuel rods 22, the uprated reactor 104 will be required to be shut down for a maintenance operation for repositioning and/or replacement of the fuel rods 122 after a relatively shorter service interval than the reactor 4. Accordingly, it may be desirable to increase the quantity of fissile material in the fuel rods 122 in order to offset the relatively greater rate of consumption of the fissile material in the uprated reactor 104. The quantity of fissile material in the fuel rods 122 can be relatively increased according to one or more of the following methodologies, as well as other methodologies.

For instance, most known fuel rods are about twelve feet in length. The fuel rods 122 can be increased to about fourteen feet in length, which would increase the quantity of fissile material therein. Alternatively, or in addition thereto, the usual uranium oxide ($UO_2$) could be replace with uranium nitride (UN) which has a relatively greater density of uranium. It is known that $^{15}N$ has a reduced neutron cross section when compared with oxygen, which can be beneficial when it is desired to operate a reactor at a relatively higher rate, such as with the uprated reactor 104, since it allows for more efficient use of the enriched uranium.

Another method of increasing the quantity of fissile material in the fuel rods 122 is to employ uranium metal particles in the fuel 184. It is also known, however, that uranium metal particles are highly reactive and can oxidize quickly in water in the event that the cladding 184 is breached, which can militate against the use of uranium metal particles in some circumstances.

Another method of increasing the quantity of fissile material within the fuel rods 122 is to optimize the compaction of the material used in making the fuel 184. In the example in which the fuel 184 is uranium oxide ($UO_2$) the density potentially could be increased from the usual current density of 95.5% solid material to a density of, say, 96.5%.

The uprated reactor 104 can also be augmented to include neutron reflectors, which are not explicitly depicted herein. Such neutron reflectors can be employed to increase the efficiency of neutron usage within the uprated reactor 104. Such increased efficiency in neutron usage can thus be said to effectively increase the quantity of fissile material in the uprated reactor 104.

It is noted that the foregoing sets forth several examples of the way in which the quantity of fissile material within the fuel rods 122 can be relatively increased. One or more of such methodologies and/or other methodologies can be employed to increase the quantity of fissile material, which is defined herein to also include improving the efficiency of the use of the fissile material. It is noted, however, that the relative quantity of fissile material in the fuel rods 122 can remain the same as in the fuel rods 22, meaning that the quantity of fissile material could remain the same, without departing from the concept of the present invention, it being understood that this likely will result in a reduced service interval for the uprated reactor 104.

By modifying the reactor 4 in one or more of the aforementioned fashions, to form the uprated reactor 104, the thermal power of the uprated reactor 104 is relatively increased, which generally will result in an uprated nuclear island 148 having a relatively increased thermal power output. In accordance with the method of the present invention, however, other methodologies may additionally or alternatively be employed to form the uprated nuclear island 148. For instance, the steam generator 64 may be replaced with a replacement steam generator 164 having a relatively greater degree of thermal efficiency. Alternatively, or in addition thereto, it may be desirable to increase the flow rate of the secondary coolant flowing through the secondary cooling loop 68 and/or to increase the change in temperature of the secondary coolant experienced when flowing through the steam generator. Depending upon the ultimate configuration of the uprated nuclear island 148, the relatively increased thermal power flowing from the uprated nuclear island 148 will be characterized by an increase in the flow rate of the secondary coolant and/or an increase in the change in temperature experience by the secondary coolant flowing through the uprated nuclear island 148. Such an increased change in temperature of the secondary coolant can result from a change in the temperature of the secondary coolant entering the nuclear island 148, a change in the temperature of the secondary coolant exiting the nuclear island 148, or both.

Figure 6:
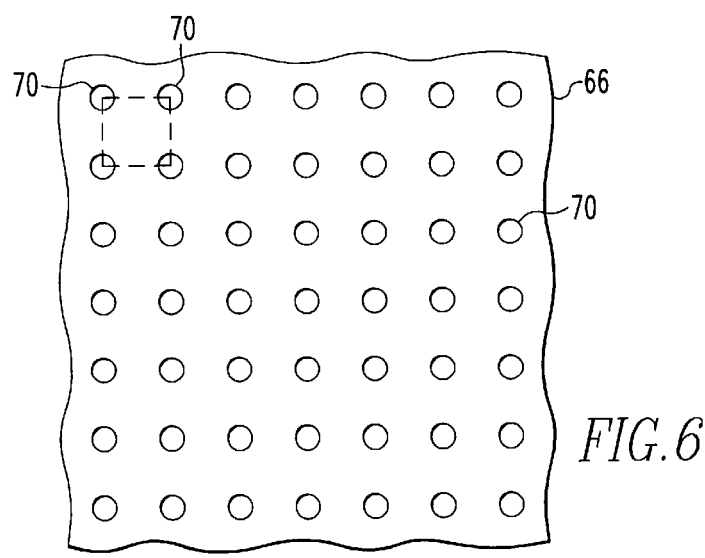
FIG. 6 is a schematic view of a portion of an exemplary steam generator of the prior art nuclear power plant of FIG. 2.
Figure 7:
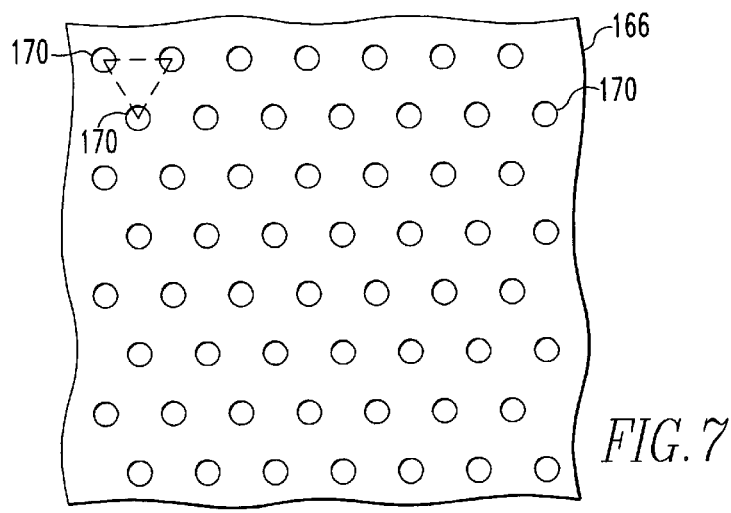
FIG. 7 is a schematic view of a portion of a steam generator that can be incorporated into the uprated power plant of FIG. 3 by performing the improved method.

FIGS. 6 and 7 schematically depict an exemplary situation in which a replacement steam generator 164 (FIG. 7) has a greater degree of thermal efficiency than an existing steam generator 64 (FIG. 6). For instance, FIG. 6 depicts a tube sheet 66 and a plurality of tubes 70 mounted thereon of the exemplary steam generator 64. In a known fashion the primary coolant flows through the interior of the tubes 70, and the secondary fluid flows about the exterior of the tubes 70, whereby the relatively hotter primary fluid in the tubes 70 transfers heat to the relatively cooler secondary coolant.

It can be seen that the tubes 70 are arranged on the tube sheet 66 according to a square pitch, meaning that a set of four mutually adjacent tubes 70 will be spaced apart from one another at the corners of an imaginary square.

As can be seen in FIG. 7, however, the exemplary replacement steam generator 164 includes a tube sheet 166 upon which are mounted a plurality of tubes 170, with the tubes 170 being arranged according to a triangular pitch. This means that three mutually adjacent tubes 170 lie at the corners of an imaginary equilateral triangle.

As can be understood from a comparison of FIGS. 6 and 7, the tubes 170 are more densely arranged than the tubes 70, meaning that a relatively greater number of the triangular pitch tubes 170 occupy a given area than the square pitch tubes 70. Moreover, the replacement steam generator 164 can be seen to provide a relatively greater number of tubes 170 than the tubes 70 within the same volume as was occupied by the steam generator 64, which provides a relatively greater heat transfer area and/or a greater degree of thermal efficiency. If it is assumed that all other parameters are equal, it can generally be stated that the change in temperature of the secondary coolant flowing through the steam generator 164 will be greater than the change in temperature of the secondary coolant flowing through the steam generator 64. Such change in temperature refers to the difference between the temperature of the liquid moderator/coolant flowing into the steam generator and the temperature of the liquid moderator/coolant flowing out of the steam generator. A relatively increased change in temperature of the liquid moderator/coolant can result from a change in the temperature of the liquid moderator/coolant entering the steam generator, a change in the temperature of the liquid moderator/coolant exiting the steam generator, or both.

It is noted, however, that the relatively greater spatial density of the tubes 170 will cause the secondary coolant to experience a relatively greater pressure drop in flowing through the replacement steam generator 164. It thus may be desirable or necessary to replace the secondary coolant pump with one more appropriate. Depending upon the ultimate configuration of the uprated nuclear power plant 140, it may be desirable to increase the flow rate of the secondary coolant through the replacement steam generator 164 and/or to permit an increase in the change in temperature of the secondary coolant flowing through the replacement steam generator 164, as described above.

The foregoing has described a number of methodologies that can be employed in converting the nuclear island 48 into the uprated nuclear island 148. As with most nuclear power plants, however, the BOP 52 likely will already be operating at its maximum capacity when the nuclear island 48 is in operation. As such, the auxiliary BOP 152 is provided in order to handle the increased thermal power flowing from the uprated nuclear island 148 and to produce additional electrical power therefrom.

The schematic auxiliary BOP 152 depicted generally in FIG. 3 includes a secondary cooling loop extension 168, an auxiliary turbine 172, and an auxiliary heat sink 176. The secondary cooling loop extension 168 is connected with the existing secondary cooling loop 68 in order to increase the overall size of the secondary cooling loop 68 which is considered to thereafter incorporate the extension 168. The auxiliary turbine 172 is operatively connected with additional electrical generators (not depicted herein) that generate electrical power. While the auxiliary heat sink 176 is depicted as being separate from the heat sink 76, it is noted that depending upon the heat sink 76, such as if it is a lake or other heat sink having additional capacity, the heat sink 76 and the auxiliary heat sink 176 may be the same heat sink.

During a scheduled maintenance operation on the reactor 4, the secondary cooling loop extension 168 is connected with the existing secondary cooling loop 68 such that the BOP 52 and the auxiliary BOP 152 can operate in parallel. While the auxiliary BOP 152 has previously been described herein as operating on the additional thermal power flowing from the uprated nuclear island 148, it is understood that the auxiliary BOP 152 is not limited to using only the excess thermal power. For instance, the BOP 52 and the auxiliary BOP 152 may be balanced such that the BOP 52 is receiving less thermal power than it was previously receiving from the nuclear island 48. In this regard, it is noted that the BOP 52 likely would have been operating at or above its peak capacity in the nuclear power plant 40, and a reduction in the thermal power directed to the BOP 52 may increase its efficiency.

It is also noted that the auxiliary BOP 152 can also be configured to entirely replace the existing BOP 52. For instance, it may be desirable to entirely abandon the existing BOP 52, such as except for portions of the secondary cooling loop 68, and to provide all of the thermal power from the uprated nuclear island 148 to the auxiliary BOP 152.

As indicated above, the auxiliary BOP 152 can be constructed in whole or in part while the nuclear power plant 40 is in operation. The auxiliary BOP 152 can then be connected with the existing secondary cooling loop 68 during a scheduled maintenance operation on the reactor 4. At such time, the nuclear island 48 likely will be the subject of one or more of the upgrades set forth above, such as with respect to the core internals, the steam generator, and/or the pressurizer, to form the uprated nuclear island 148 from which a relatively increased thermal power flows.

It thus can be seen that the nuclear power plant 40 can be uprated into the plant 140 by increasing the thermal power flowing from the nuclear island 48 to form the uprated nuclear island 148, and by constructing and connecting the auxiliary BOP 152 thereto to form the uprated plant 140. As described above, numerous methodologies may be employed to convert the nuclear island 48 into the uprated nuclear island 148, such as by modifying the reactor 4 to form the uprated reactor 104 and by replacing the steam generator 64 with the replacement steam generator 164. Such changes to the nuclear island 48 to form the uprated nuclear island 148 advantageously can be configured to occupy the same space in the containment 56. The uprated reactor 104 can be configured to include a relatively greater quantity of fissile material in order to extend the service interval thereof and/or to offset the reduction in the service interval that otherwise would occur with an increase in the thermal output of the reactor 104.

It thus can be seen that the existing nuclear power plant 40 can be converted according to the method of the present invention to provide the uprated nuclear power plant 140. In such fashion, the power rating of the plant 40 may be increased by 20% or more. Since the uprated plant 140 includes both the uprated reactor 104 and the auxiliary BOP 152, the uprated plant 140 can be licensed at the relatively higher power level. In so doing the containment 56 substantially did not require any modification.

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of increasing the electrical power output of an existing nuclear power plant, the plant including a nuclear island and a balance of plant connected together, the nuclear island including a containment having an interior, a pressurized water reactor having a number of fuel rods that include fissile material, and a steam generator, the reactor and the steam generator being disposed within the interior of the containment, the containment outputting thermal power, and the balance of plant outputting electrical power, the method comprising:

operating the nuclear island during a first time period to output from the containment thermal power at a first rate:

constructing an auxiliary balance of plant, at least a portion of said constructing an auxiliary balance of plant occurring during at least a portion of the first time period while the nuclear island is operating;

connecting the auxiliary balance of plant with the nuclear island;

increasing the thermal power output from the containment by operating the nuclear island during a second time period substantially subsequent to connection of the auxiliary balance of plant with the nuclear island to output from the containment thermal power at a second rate that is relatively greater than the first rate;

delivering a portion of the thermal power to the auxiliary balance of plant; and outputting electrical power from the auxiliary balance of plant.

2. The method as set forth in claim 1, in which the reactor outputs thermal power;

said increasing the thermal power output from the containment including;
  operating the reactor to output thermal power at a first rate; and
  increasing the thermal power output of the reactor by subsequently operating the reactor to output thermal power at a second, relatively higher rate.

3. The method as set forth in claim 2, in which
the fuel rods have a surface area to volume ratio;
said increasing the thermal power output of the reactor including increasing the surface area to volume ratio of the fuel rods by replacing at least a portion of the fuel rods with alternate fuel rods having a relatively higher surface area to volume ratio.

4. The method as set forth in claim 3, in which
the fuel rods include cylindrical fuel rods; and
said increasing the surface area to volume ratio of the fuel rods includes replacing the cylindrical fuel rods with annular fuel rods.

5. The method as set forth in claim 4, in which
said replacing the cylindrical fuel rods with annular fuel rods includes replacing the cylindrical fuel rods with annular fuel rods having an annular cladding within which is disposed fissile material.

6. The method as set forth in claim 3, in which
said increasing the thermal power output of the reactor includes installing neutron reflectors within the containment.

7. The method as set forth in claim 3, further comprising increasing the quantity of fissile material in the fuel rods.

8. The method as set forth in claim 7, in which said increasing the quantity of fissile material in the fuel rods includes at least one of:
  replacing the fuel rods with other fuel rods that are relatively longer;
  installing neutron reflectors to increase the efficiency of neutron usage;
  replacing the fissile material with other fissile material having a lower neutron cross section;
  increasing the concentration of the fissile material compared with non-fissile material in the fuel rods; and
  increasing the density of the fissile material in order to accommodate more fissile material in the fuel rods.

9. The method as set forth in claim 2, in which
the steam generator is a square-pitch steam generator;
said increasing the thermal power output from the containment including replacing the square-pitch steam generator with a triangular-pitch steam generator.

10. The method as set forth in claim 1, in which
the reactor outputs thermal power and includes a primary cooling loop carrying a primary coolant;
the plant including a secondary cooling loop carrying a secondary coolant and being connected with the balance of plant and the auxiliary balance of plant;
the steam generator thermally connecting together the primary and secondary cooling loops;
said increasing the thermal power output from the containment including at least one of:
  increasing the thermal power output of the reactor;
  increasing the flow rate of the primary coolant;
  increasing the change in temperature of the primary coolant flowing through the steam generator;
  increasing the change in temperature of the primary coolant flowing through the reactor;
  increasing the flow rate of the secondary coolant;
  increasing the change in temperature of the secondary coolant flowing through the steam generator; and
  increasing the thermal efficiency of the steam generator.

11. The method as set forth in claim 1, further comprising:
connecting the auxiliary balance of plant with the containment contemporaneously with the performance of a maintenance operation on the reactor.

12. The method as set forth in claim 11, further comprising:
at least partially building the auxiliary balance of plant prior to initiating the maintenance operation on the reactor.

13. The method as set forth in claim 12, further comprising:
at least partially building the auxiliary balance of plant while the power plant is operating.

14. The method as set forth in claim 1, further comprising:
ceasing to generate electrical power from the balance of plant.

15. A method of increasing the electrical power output of an existing nuclear power plant substantially without a need of altering a containment of the plant, the plant including a nuclear island and a balance of plant connected together, the nuclear island including the containment which includes an interior, a pressurized water reactor having a number of fuel rods that include fissile material, and a steam generator, the or and the steam generator being disposed within the interior of the containment, the reactor outputting thermal power, and the balance of plant outputting electrical power, the method comprising:
  operating the nuclear island during a first time period to output from the reactor thermal power at a first rate;
  constructing an auxiliary balance of plant at least constructing an auxiliary balance of plant occurring during at least a portion of the first time period while the nuclear island is operating;
  thermally connecting the auxiliary balance of plant with the reactor;
  increasing the thermal power output from the containment by operating the nuclear island during a second time period substantially subsequent to connection of the auxiliary balance of plant with the reactor to output from the reactor thermal power at a second rate that is relatively greater than the first rate;
  and
  outputting electrical power from the auxiliary balance of plant.

16. The method as set forth in claim 15, in which
the fuel rods have a surface area to volume ratio;
said increasing the thermal power output of the reactor including increasing the surface area to volume ratio of the fuel rods by replacing at least a portion of the fuel rods with alternate fuel rods having a relatively higher surface area to volume ratio.

17. The method as set forth in claim 16, in which
the fuel rods include cylindrical fuel rods; and
said increasing the surface area to volume ratio of the fuel rods includes replacing the cylindrical fuel rods with annular fuel rods.

18. The method as set forth in claim 17, in which
said replacing the cylindrical fuel rods with annular fuel rods includes replacing the cylindrical fuel rods with annular fuel rods having an annular cladding within which is disposed fissile material.

19. The method as set forth in claim 15, further comprising
increasing the quantity of fissile material in the fuel rods.

20. The method as set forth in claim 19, in which
said increasing the quantity of fissile material in the fuel rods includes least one of:
replacing the fuel rods with other fuel rods that are relatively longer;
installing neutron reflectors to increase the efficiency of neutron usage;
replacing the fissile material with other fissile material having a lower neutron cross section;
increasing the concentration of the fissile material compared with non-fissile material in the fuel rods; and
increasing the density of the fissile material in order to accommodate more fissile material in the fuel rods.

21. The method as set forth in claim 15, in which
the reactor includes a primary cooling loop crying a primary coolant;
the plant including a secondary cooling loop carrying a secondary coolant and being connected with the balance of plant and the auxiliary balance of plant;
the steam generator thermally connecting together the primary and secondary cooling loops;
the method further comprising at least one of:
increasing the flow rate of the primary coolant;
increasing the change in temperature of the primary coolant flowing through the steam generator;
increasing the change in temperature of the primary coolant flowing through the reactor;
increasing the flow rate of the secondary coolant;
increasing the change in temperature of the secondary coolant flowing through the steam generator; and
increasing the thermal efficiency of the steam generator.

22. The method as set forth in claim 15, further comprising:
connecting the auxiliary balance of plant with the containment during a scheduled shutdown of the reactor for the performance of a maintenance operation on reactor.

23. The method as set forth in claim 22, further comprising:
at least partially building the auxiliary balance of plant prior to initiating the shutdown of the reactor.

24. The method as set forth in claim 23, further comprising:
at least partially building the auxiliary balance of plant while the power plant is operating.

25. The method as set forth in claim 15, further comprising:
modifying the reactor to increase the thermal power output thereof substantially without altering the volume occupied by the reactor; and
replacing the steam generator to increase the efficiency thereof substantially without altering the volume occupied by the steam generator.

26. The method as set forth in claim 15, further comprising:
ceasing to generate electrical power from the balance of plant.

* * * * *